United States Patent [19]

Czech et al.

[11] Patent Number: 4,758,450

[45] Date of Patent: Jul. 19, 1988

[54] OBJECT COATED WITH PLASTIC AND PROCESS FOR PRODUCING IT

[75] Inventors: Gunther Czech, Filderstadt; Theodor Fessel, Ansbach, both of Fed. Rep. of Germany

[73] Assignee: Simro AG, Chur, Switzerland

[21] Appl. No.: 861,323

[22] Filed: May 9, 1986

[30] Foreign Application Priority Data

May 14, 1985 [DE] Fed. Rep. of Germany ....... 3517453

[51] Int. Cl.$^4$ .............................................. B05D 1/22
[52] U.S. Cl. ..................................... 427/185; 427/195
[58] Field of Search ................................ 427/185, 195

[56] References Cited

U.S. PATENT DOCUMENTS

| | | | |
|---|---|---|---|
| 3,032,816 | 5/1962 | Zimmerli | 427/185 X |
| 3,756,852 | 9/1973 | Scheetz et al. | 427/185 X |
| 3,939,547 | 2/1976 | Bernier | 427/195 X |
| 4,271,211 | 6/1981 | Knepper | 427/195 |
| 4,288,468 | 9/1981 | Utner | 427/185 X |
| 4,531,947 | 7/1985 | Engelhardt | 427/195 |

FOREIGN PATENT DOCUMENTS

| | | | |
|---|---|---|---|
| 52-14641 | 2/1977 | Japan | 427/195 |
| 2042930 | 2/1979 | United Kingdom | 427/195 |

*Primary Examiner*—Shrive P. Beck

[57] ABSTRACT

An object coated with plastic described, whereby the object consists of high-melting plastic onto which a coating is melted of plastic powder. The method is specifically concerned with coating spectacle frames with resin powder in a vortical sintering bath.

3 Claims, No Drawings

OBJECT COATED WITH PLASTIC AND PROCESS FOR PRODUCING IT

FIELD OF THE INVENTION

The present invention relates to an object coated with plastic, in particular a spectacle frame or part thereof, as well as a process for producing this coating.

PRIOR ART

Known in the art is coating metal parts according to the so-called vortical sintering process. For this purpose the hot metal part is immersed into a vortical sintering bath in which whirled up resin powder particles are located. The powder coming into contact with the hot metal parts melts and forms a film. By using this vortical sintering bath known in the art, uniform coatings can be applied to metal parts.

From U.S. Pat. No. 4,531,947 issued July 30, 1985 to Englehardt a process is known in the art of applying a color coating to spectacle frames on which a coating of a resiniferous plastic powder was applied. The metallic spectacle frame was heated up for this purpose and resin powder was electrostactically sprayed on the preheated frame. The frame covered with resin powder is then baked, through which process the powder melts to form a coating. Following this, the frame covered with the plastic is dipped into a hot colored solution and after being removed from the color bath is heated up, through which process the dye is diffused in the plastic coating. Through this process known in the art a color coating is achieved that is especially abrasion-proof and essentially resistant to solvents. However, this process known in the art can only be used on spectacle frames made of metal since only metals will remain sufficiently stable in form against the sintering temperatures employed here of from 170° C. and 250° C.

In U.S. patent application Ser. No. 667,966 spectacle frames and parts thereof are described comprised of polyetherimide or polyether sulfone. Such spectacle frames distinguish themselves by their high degree of rigidity, a low specific gravity, excellent resistance to heat and a high elastic capability of restoring itself to its original position comparable to spectacle frames made of metal.

Also known in the art is coating a spectacle frame with an emulsion compound containing organic solvents. The coating of organic solvents does not always produce a uniform thickness of the layer. In addition, employing organic solvents involves environmental problems.

OBJECT OF THE INVENTION

The present invention is based on the objective of making available an object coated with plastic, in particular a spectacle frame or part thereof, as well as a process for producing this which can be supplied with a uniform coating in a manner that is particularly gentle on the materials without employing organic solvents, through which process the coating shows good resistance to abrasion, adheres well and can be dyed as desired.

SUMMARY AND ADVANTAGES OF THE INVENTION

The application of a vortical sintering process on objects composed of high-melting plastics offers fairly considerable advantages over coating techniques known in the art. The vortical sintering process is especially gentle to materials and always results in the desired unform thickness. Since the process is possible without the use of solvents, it is especially non-polluting and clean. With the present invention it has been found that the plastic powder sintered on the plastic object manifests a high resistance to abrasion and adheres well. By applying dye pigments the desired color hues can be applied to the plastic object in the vortical sintering process without making it necessary to make a separate color coating. In this manner it is possible to achieve the desired visual effects in one single step. In addition, this process has the advantage of permitting physiologically risky plastics to be coated with a physiologically unobjectionable coating.

The present invention will now be more closely explained with reference to spectacle frames and parts thereof.

The high-melting plastic for the spectacle frame or part thereof should have a melting point or softening point of at least 150° C., preferably 170° C. It is practical for the melting or softening temperature of the high-melting plastic to be between 150° C. to 240° C., preferably between 170° C. to 230° C. As high-melting plastics the following will be preferably employed: polyetherimide, polyether sulfone, polysulfone, polyphenylene sulfide, polyphenylene oxide, polyimide, polyamidimide, polyaryl sulfone, polyether etherketone, polyamide, polyester, epoxide or polyurethane.

One preferred material for the spectacle frame or part thereof is a polyetherimide with the following repeating unit:

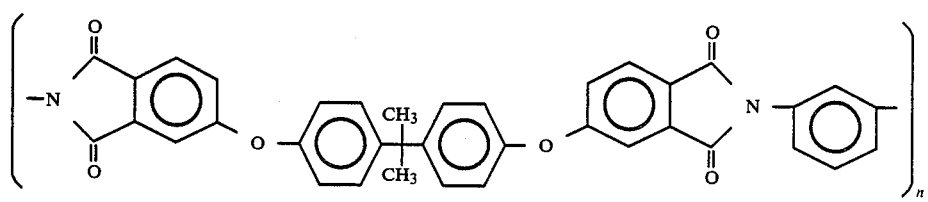

This polyetherimide is heavily yellowish, amber-colored, transparent, thermoplastic plastic which displays the following properties: a tensile strength, measured according to DIN 53455, of 90 to 140 N/mm², a stretching to the breaking point, measured according to DIN 53455, of 40% to 80%, a bending module, measured according to DIN 53456, of from 2500 to 5000 N/mm², an IZOD notch-impact strength, measured according to ASTM D 256, of 30 to 90 J/m, a glass temperature of 210° C. to 230° C., a stability of shape against heat DTUL, measured according to ASTM D 648, of 190° C. to 210° C. and a thickness, measured according to DIN 53479, of 1.10 to 1.50 Mg/m³.

One especially preferred material is a polyetherimide with the following properties: a tensile strength, measured according to DIN 53455, of 100 to 110 N/mm², a stretching to the breaking point, measured according to DIN 53455 of 55% to 65%, a bending module, measured according to DIn 53457, of from 3000 to 3500 N/mm², an IZOD notch impact strength, measured according to ASTM D 256, of from 40 to 60 J/m, a glass temperature of from 215° C. to 220° C., a stability of shape against heat DTUL, measured according to ASTM D 648, of from 195° C. to 205° C., and a thickness, measured according to DIN 53479, of from 1.25 to 1.30 Mg/m³.

Suitable pothetherimides are described in the commercial brochure "Ultem" from General Electric Plastic Europe. Especially preferred plastics are the unreinforced polyetherimides ("Ultem 1000 and 1010"), as well as modified and reinforced types.

One further suitable high-melting plastic is a polyether sulfone with the following repeating unit:

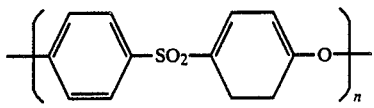

The above depicted polyether sulfone is a highly yellow colored, transparent, thermoplastic plastic which will preferably manifest the following properties: a tensile strength at 20° C., measured according to DIN 53455, of from 60 to 140 N/mm², a stretching to the breaking point, measured according to ASTM D 638, of from 30% to 90%,, a bending module at 20° C., measured according to ASTM D 790, of from 2000 to 6000 N/mm², an IZOD notch impact strength, measured according to ASTM D 256 (6.4 mm test body notched), of from 60 to 100 J/m, a softening point according to Vicat, measured according to ASTM D 1525, of from 210° C. to 230° C., a stability of shape against heat DTUL, measured according to ASTM D 648, of from 190° to 210° C., and a thickness, measured according to ASTM D 792, of from 1.20 to 1.50 Mg/m³.

One especially preferred material is a polyether sulfone with the following properties: a tensile strength at 20° C., measured according to DIN 53455, of from 70 to 110 N/mm2, a stretching to the breaking point, measured according to ASTM D 638, of from 40% to 80%, a bending module at 20° C., measured according to ASTM D 790, of from 2000 to 3000 N/mm², an IZOD notch-impact strength, measured according to ASTM D 256 (6.4 testing body notched), of from 70 to 90 J/m, a softening point according to Vicat, measured according to ASTM D 1525, of from 220° C. to 230° C., a stability of shape against heat DTUL, measured according to ASTM D 648, of from 200° C. to 210° C. and a thickness, measured according to ASTM D 792, of from 1.30 to 1.40 Mg/m³.

Suitable polyether sulfones are, for example, "Victrex" by ICI. Especially preferred materials are the reinforced types Victrex 200 P and 300 P, as well as modified and reinforced types.

The high-melting plastic can be reinforced by means of glass, carbon, or armide fibers or glass spheres; however, the plastic preferably should not be reinforced.

It will be practical for the plastic powder used for the vortical sintering bath to have a melting temperature in the range of from 90° C. to 210° C., preferably from 110° C. to 190° C. Suitable plastics are polyamides, saponified ethylenevinyl acetate-copolymer (ethylene-vinyl-alcohol-copolymer), polyether block amide and epoxides. As for the polyether block amides, the following types are predominantly in use: (PEBA) Pebax (trade mark) Nos. 5533 SN 00, 4033 SN 00, 3533 SN 00, 5533 SN 70, 4033 SN 70, 5533 SD 00, 4033 SD 00, 3533 SD 00, 5512 MN 00, 5562 MN 00, 4011 RN 00, 2533 SD 00 by the firm of Atochem. Suitable ethylene-vinyl-alcohol-copolymers are commercially available under the name "Levasint" and suitable polyamide types under the trade name "Orgasol".

It is practical that thickness of the plastic power coating amount to 20 to 500 μm, preferably from 100 to 300 μm. If the coating is intended to be dyed, the plastic powder can contain the dye pigments.

The object coated with plastic is obtained by (a) preheating an object made of high-melting plastic to a temperature that will be sufficient to melt the plastic powder onto the object;

(b) by dipping the preheated object into a vortical sintering bath of plastic powder and keeping it there for a certain interval of time until a plastic film has melted on it with the desired thickness; and (c) removing the coated object from the vortical sintering bath and allowing it to cool. This process can be repeated several times.

It is useful to select the preheating temperature and the immersion period with reference to the melting or softening temperature of the high-melting plastic, the thickness of the object to be coated and the melting temperature of the plastic powder. The temperature desired for the object can be attained by preheating the object some 10 seconds to 15 minutes, preferably from 0.5 to 2 minutes long. The object removed from the vortical sintering bath is cooled down rapidly, preferably within 30 to 360 seconds so that a good smooth finish on the surface can be guaranteed. In addition, the object after cooling can be brought back to the melting temperature of the plastic powder. This additional heating up is called "refinishing".

If a spectable frame or part thereof made of polyetherimide or polyether sulfone is to be given a coating of ethylenevinyl alcohol-copolymer, polyamide, epoxide or polyether block amide by means of vortical sintering, the spectacle frame or part thereof should be preheated to a temperature range of 170° C. to 230° C. and the preheated spectacle frame or preheated part should be immersed for 1 to 5 seconds long into the vortical sintering bath.

The dipping treatment can be repeated several times, if necessary, to attain the desired thickness of the coating.

The present invention is explained in detail in the following with reference to the examples.

EXAMPLE 1

A spectacle temple made of polyetherimide (Ultem 1000, 1010 supplied by the firm of General Electric) was produced by injection-molding at approximately 400° C. The wall thickness of the temple was designed to be somewhat stronger than that of a comparable metal temple. The temple was preheated for some 2 minutes to a temperature of 210° C. The preheated spectacle temple was then immersed in a vortical sintering bath containing a polyamide for the plastic powder. Following an immersion period of 3 seconds the temple was removed again and evaluated. One could observe that the temple was coated with a perfectly smooth and uniform layer of polyamide of about 100 μm thickness.

The coating showed good non-abrasive quality and skin compatibility.

EXAMPLE 2

The procedure in Example 1 was repeated, except for the fact that a spectacle temple was used made of polyether sulfone (Victrex 200 P supplied by ICI). The preheating temperature of the spectacle frame amounted to 200° C. and the immersion period was 5 seconds. A coating was obtained with a layer thickness of some 150 μm. Perfectly coated spectacle temples with uniform coating thicknesses were achieved in this instance as well.

EXAMPLE 3

The procedure in Example 1 was repeated, except for the fact that polyether block amide (Pebax), supplied by the firm of ATO, was used as the plastic powder. The preheating temperature of the spectacle temple was 210° C. and the immersion period amounted to 2 seconds. A coating was obtained with a thickness of some 60 μm. The coating melted on was completely uniform and visually perfect.

EXAMPLE 4

Example 1 was repeated, except for the fact that the plastic powder contained a color pigment. After performing the vortical sintering procedure a uniform coating was obtained on the spectacle temple with the desired hue of color.

An object coated with plastic is described, whereby the object is composed of high-melting plastic onto which a coating is melted of plastic powder.

We claim:
1. A process of coating a spectacle frame or part thereof composed of polyetherimide or polyethersulfone with a plastic powder comprising the steps of:
   a. preheating the spectacle frame or part thereof to a temperature in the range of from 170° C. to 230° C.
   b. immersing the preheated spectacle frame or part from 1 to 5 seconds in a vortical sintering bath of ethylenevinyl-alcohol-copolymer, polyether block amide, epoxide, polyamide or mixtures of these; and
   c. removing the spectacle frame or part from the vortical sintering bath and allowing said spectacle frame or part to cool.

2. The process of claim 1 wherein the high melting plastic is a polyetherimide which manifests the following repeating unit:

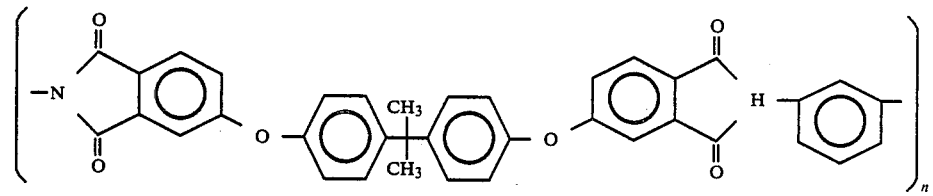

3. The process of claim 1 wherein the high melting plastic is a polyethersulfone which manifests the following repeating unit:

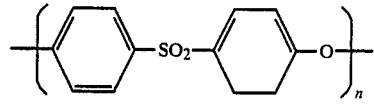

* * * * *